United States Patent [19]

McManama

[11] Patent Number: 4,540,328
[45] Date of Patent: Sep. 10, 1985

[54] LOGGING TRAILER

[76] Inventor: Charles E. McManama, 27484 SE. Paul Bunyan La., Eagle Creek, Oreg. 97022

[21] Appl. No.: 444,813

[22] Filed: Nov. 26, 1982

[51] Int. Cl.³ .............................................. B60P 1/00
[52] U.S. Cl. .................................................... 414/538
[58] Field of Search ............... 414/469, 482, 483, 494, 414/537, 538; 193/17

[56] References Cited

U.S. PATENT DOCUMENTS 2,572,945 10/1951 Quesnoit ........................ 414/538 X
3,339,656 9/1967 Blonsky .......................... 414/537 X Primary Examiner—Robert G. Sheridan

[57] ABSTRACT

In a transport trailer, an integral loading-ramp system including a rear pivotally-attached ramp, an elevatable front-mounted winch, and structural linkage therebetween that counter-balances the ramp and the winch; enabling quick easy lowering of the ramp and elevating of the winch, and vice versa.

4 Claims, 3 Drawing Figures

LOGGING TRAILER

SPECIFICATION

There is a need for economical machinery to efficiently gather logs where felled and to transport them to a nearby yarding area or processing facility.

The present invention is a means that enables a transport trailer to be efficiently used for this purpose. Most significant is the fact that a trailer so-equipped can be towed by an agricultural or general purpose tractor, thereby giving such tractors a greater range of utility and greatly increasing their efficiency for such use.

The invention essentially is a loading ramp system integral with the trailer that includes a rear pivotally-attached ramp, an elevatable front-mounted winch, and structural linkage therebetween that counterbalances each; providing quick easy change from transport position to loading position and vice versa. The ramp, in its most advanced form, is modified in that it is made up of a series of individual segments; which, independently hinged, when in lowered position provides conformation with irregularities in the surface of the ground to prevent snagging on the ends thereof during loading. And when the ramp is thus lowered, the counterbalanced winch at the same time is raised to hoisting position to tow a log aboard.

Describing in greater detail, I refer now to the drawings.

Figure 1:
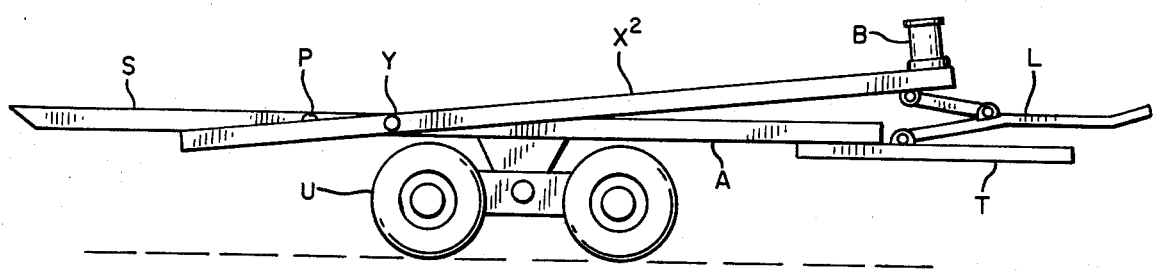
FIG. 1 is a side view of the trailer in transport position.
Figure 2:
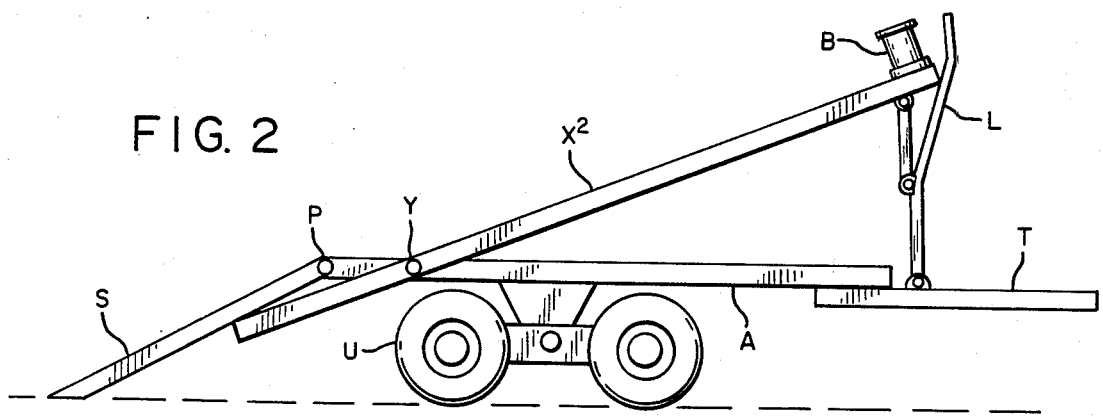
FIG. 2 is the same side view of the trailer when in loading position.
Figure 3:
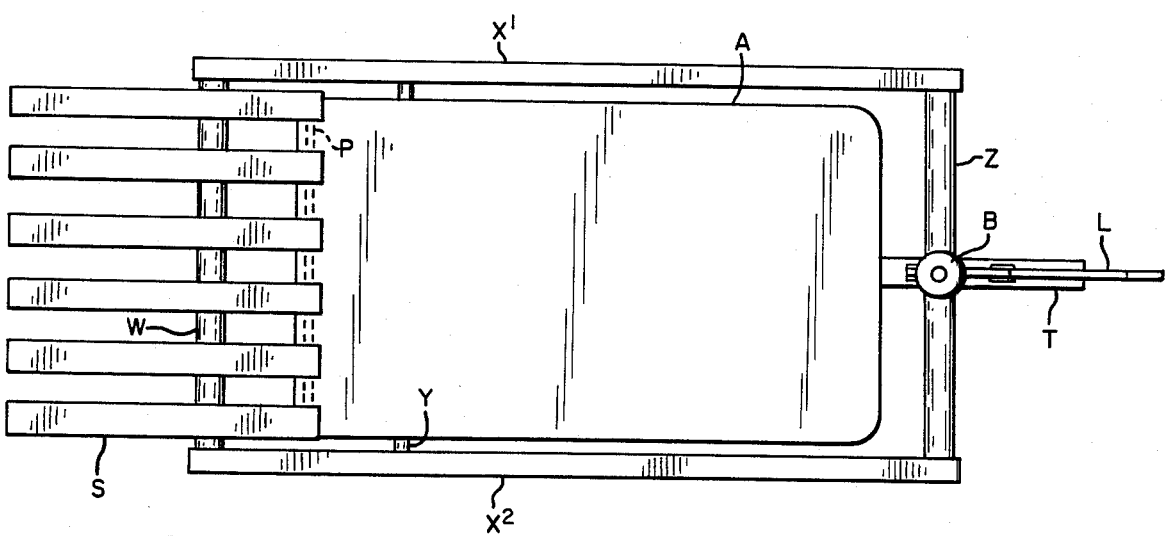
FIG. 3 is a top view of the trailer.

Key to the invention is the aforesaid structural linkage which functions as a balance beam, in effect. This comprises the side members (X-1 and X-2) which straddle the load platform (A) and are pivotally connected at points (Y) on each side thereof. The said side members (X-1 and X-2) are connected by a crossmember (Z) supporting the winch (B) and by crossmember (W) under the loading ramp which comprises segments (S) hingedly mounted to the load platform at (P). A lifting lever (L) provides the necessary firm support for the winch (B) when elevated, locking overcenter as shown in FIG. 2 (by obvious means). It also provides the added leverage needed to lift the winch the final few inches after the counterbalancing effect of the ramp is disengaged from crossmember (W). Coincidentally, this said disengagement from crossmember (W) is necessary to allow the segments (S) to independently conform to irregularities in the surface of the ground.

The trailer undercarriage is identified by (U) and the tongue is identified by (T).

Of course, the invention need not be limited to a trailer, but may also be installed upon a self-propelled vehicle likewise having a load platform. And such things as the load platform are not necessarily limited to the form illustrated. Obviously, advantageous use may include the loading of objects other than logs.

Having described my invention, I make the following claims:

1. A load handling transport vehicle comprising a wheel support load platform, a loading ramp hinged to the rear end of said platform, a rectangular frame straddling said platform and pivoted to said platform at the sides thereof, said frame having a front and rear crossmember with the rear crossmember being under said ramp and engageable therewith, whereby upon pivoting of said frame said ramp is pivoted between a ground engaging and load transporting position.

2. A transport vehicle as in claim 1, further including a winch mounted on the front crossmember, said winch serving to haul articles up said ramp and onto said platform.

3. A transport vehicle as in claim 2, further including an overcenter lockable lever disposed between the platform and front crossmember, said lockable lever comprising a lever pivotally mounted to the platform and an adjoining arm pivotally mounted to the front crossmember.

4. A transport vehicle as in claim 3, wherein said loading ramp comprises independent segments.

* * * * *